J. D. OTSTOT.
Lifting-Jacks.
No. 5,263. *Fig. 1.*
*Fig. 2.* Reissued Jan. 28, 1873.
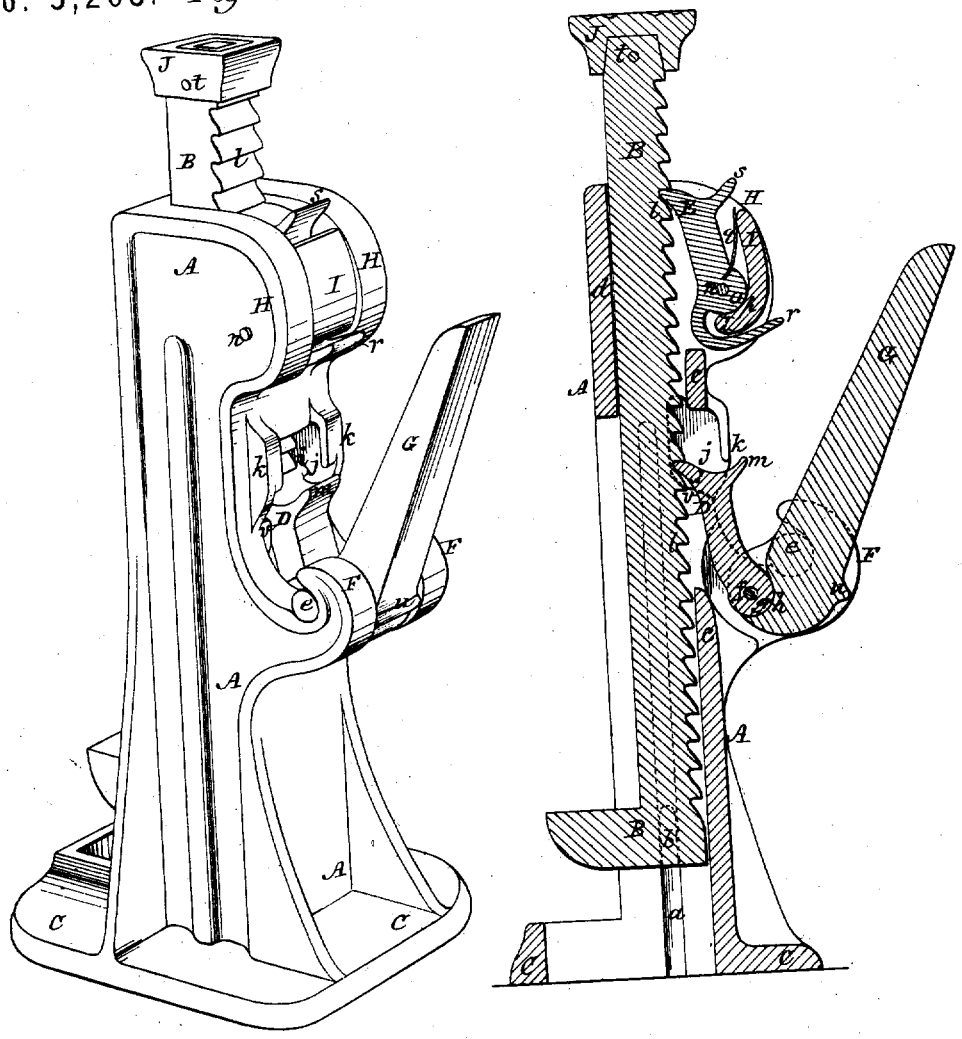
Witnesses.
D. P. Cowl
Edmund Masson.
Inventor.
John D. Otstot.
By atty A. B. Stoughton.
AM. PHOTO-LITHOGRAPHIC CO. N.Y. (OSBORNE'S PROCESS)

UNITED STATES PATENT OFFICE.

JOHN D. OTSTOT, OF SPRINGFIELD, OHIO.

IMPROVEMENT IN LIFTING-JACKS.

Specification forming part of Letters Patent No. 133,949, dated December 17, 1872; reissue No. 5,263, dated January 28, 1873.

*To all whom it may concern:*

Be it known that I, JOHN D. OTSTOT, of Springfield, in the county of Clarke and State of Ohio, have invented certain new and useful Improvements in Lifting-Jacks; and I do hereby declare the following to be a full, clear, and exact description of the same, reference being had to the accompanying drawing making a part of this specification, in which—

Figure 1 represents a perspective view of the jack, and Fig. 2 represents a vertical section through the same.

My invention relates to the construction and arrangement of the several devices constituting a lifting-jack, as will be hereinafter explained.

The stock A is cast hollow for the reception of the lifting-bar B, and has upon it and in it certain openings, flanges, and ways for receiving, guiding, and controlling the several operative parts of the jack. The base-piece C is cast with the stock, and the latter is also provided with re-enforcements, so as to make it as light as possible with due regard to the strain it must endure. On the inside of the stock are cast ways *a*, in which lugs or projections *b* on the sides of the lifting-bar B work to steady said bar in its movements. At the rear of the stock there is a solid portion, *d*, and at its front other solid portions, *c*, of the stock, to steady and guide the lifting-bar. Those in front—viz., at *c*—prevent said bar from being forced against the lifting and holding pawls D E. In suitably projecting and curved arms F on the front of the jack are formed open bearings for receiving the trunnions or journals *e* of the lifting-lever G, and to this lever, as at *f*, is pivoted the lifting-pawl D, the end *g* of which is rounded off, and moves in a similarly-rounded seat, *h*, in the lever G, so that the strain on the lifting-pawl shall come upon said rounded surfaces, and not upon the pivot-pin *f*. The head or top of the lifting-pawl has lateral projections *i* upon it, which work in ways *j* formed on the inner side of the projecting flanges *k* to prevent the head from dropping out of or away from its working position, or where it takes into the notches or shoulders *l* of the lifting-bar B. There is also a thumb-piece or projection, *m*, upon the head of the lifting-pawl, by which it may be caught and drawn back when the lifting-bar is to be permitted to run down in the stock, but may be used for a purpose hereafter described. The holding-pawl E is pivoted, as at *n*, to projecting flanges H cast on the stock, and it, too, has a rounded hub, *o*, which moves in or against a rounded seat or bearing, *p*, formed in the solid portion I of the stock, upon which seat, instead of upon the pivot-pin *n*, the strain comes. The head of the holding-pawl takes against or under the notches in the lifting-bar B to hold said bar while the lifting-lever is raised to take a new purchase or set. The holding-pawl is thrown inward against the notches of the lifting-bar by a spring, *q*, and a tail-piece, *r*, which is a part of the holding-pawl, curves downward and outward from the under portion of said pawl, and extends far enough beyond the portion I to be struck by the lifting-lever G, when the latter is thrown clear up for that purpose, to disengage said holding-pawl from the teeth of the lifting-bar to allow the latter to run down into the stock. The holding-pawl E has a thumb-piece, *s*, upon its head, by which said pawl may be drawn back when desired. The solid portion I, besides its duty in supporting the holding-pawl E and spring *q*, serves as a shield to the pawl, so that it may not be accidentally struck and thrown out of action when sustaining the load or strain upon the lifting-bar. The cap J on the head of the lifting-bar B is secured thereon by a pin or pivot, *t*; and to take the jack apart this pin must first be taken out and the cap removed; then the lifting-bar will drop through and out of the opening made through the stock and the base-piece. The lifting-bar being thus removed, then the lifting-lever and its lifting-pawl may be taken out. Until the bar B is first removed from the stock the lifting-lever G and its pawl D cannot be detached, for when swung around far enough to admit of its trunnions or journals leaving their seats, then the projection *u* on the under side of the lever comes against the bar B, and it can go no further, and in that position cannot be removed. Without this or other equivalent construction the lever and pawl might be displaced or carried off. By such construction the journals and bearings may be wrought on or cast upon the lever and pawl, and the two placed in or taken out of the stock with great facility when necessary.

When the lifting-lever G is thrown clear up to disengage the top or holding pawl E the lifting-pawl D, by the same act, is drawn against the guide-ways *v*, and moved outward and out of action with the lifting-bar B, when the latter, being freed from both pawls by this automatic operation, will drop or run down into the stock A.

I have described the thumb-piece *m* as and for the purpose of moving the lifting-pawl D out of action with the lifting-bar B. It may be used for such purpose, but its principal purpose is to enable the operator to adjust said pawl when the jack is used for lowering a load.

Having thus fully described my invention, what I claim is—

1. The combination of the lifting-lever G and its lifting-pawl D, when said lever is pivoted by trunnions thereon working in open bearings upon the stock A, as and for the purpose described and represented.

2. In combination with the lifting-pawl D, the lateral projections *i* upon its head and the recessed ways *j* in the flanges of the stock, as and for the purpose described.

3. In combination with the lifting-lever G and the holding-pawl E, the projection *r* upon the latter, so that it may be struck by said lever to throw said pawl out of action with the lifting-bar, as and for the purpose described.

4. The combination and arrangement of the stock, lifting-bar and its cap, and lifting-lever and its lifting-pawl, whereby the bar cannot be removed without first removing the cap, and the lifting-lever and its pawl cannot be removed without first removing the lifting-bar, as and for the purpose described and represented.

5. In combination with the lifting-lever G and lifting-pawl D, the guides or ways *v*, by which, when the lever is thrown up to release the holding-pawl, the lifting-pawl will be drawn out of action also, as described and represented.

JOHN D. OTSTOT.

Witnesses:
J. R. MOWER,
GEO. C. RAWLINS.